United States Patent [19]

Vahlkamp et al.

[11] 4,195,958
[45] Apr. 1, 1980

[54] BALE UNROLLER

[76] Inventors: Vernon F. Vahlkamp, R.R. 2; Wayne Diekemper, 1111 Montgomery, both of Carlyle, Ill. 62231

[21] Appl. No.: 910,474

[22] Filed: May 30, 1978

[51] Int. Cl.² .................................................. B65H 75/40
[52] U.S. Cl. ............................... 414/24.6; 242/86.5 R; 414/130; 414/528; 414/786; 414/911
[58] Field of Search ...................... 414/24.5, 24.6, 528, 414/129, 130, 518, 911, 757, 786; 242/86.5 R, 86.52

[56] References Cited

U.S. PATENT DOCUMENTS

| 3,874,609 | 4/1975 | Larson | 414/24.6 |
| 4,082,198 | 4/1978 | Anderson | 414/518 X |

Primary Examiner—Stephen G. Kunin
Assistant Examiner—George F. Abraham
Attorney, Agent, or Firm—Lockwood, Dewey, Alex & Cummings

[57] ABSTRACT

A bale unroller for unrolling cylindrical bales of hay. A boxlike container has a side door for insertion of a bale of hay onto an elevated and inclined floor. A plurality of angle irons extends transversely across a floor and are connected at ends by chains which are in turn driven by sprockets. As the sprockets are driven, the angle irons slidably move along the floor to impart rotative movement to the bale. A plurality of rollers, horizontally disposed above the floor at the discharge end of the unroller, limit forward movement of the bale. A pair of wheels, which are pivotally supported by a framework, urge the bale forward to keep it in contact with the rollers. The sheet of hay, which is removed from the bale, is fed from the unroller by a lower roller and by a paddle conveyor. Methods of unrolling a cylindrical bale are also provided.

20 Claims, 7 Drawing Figures

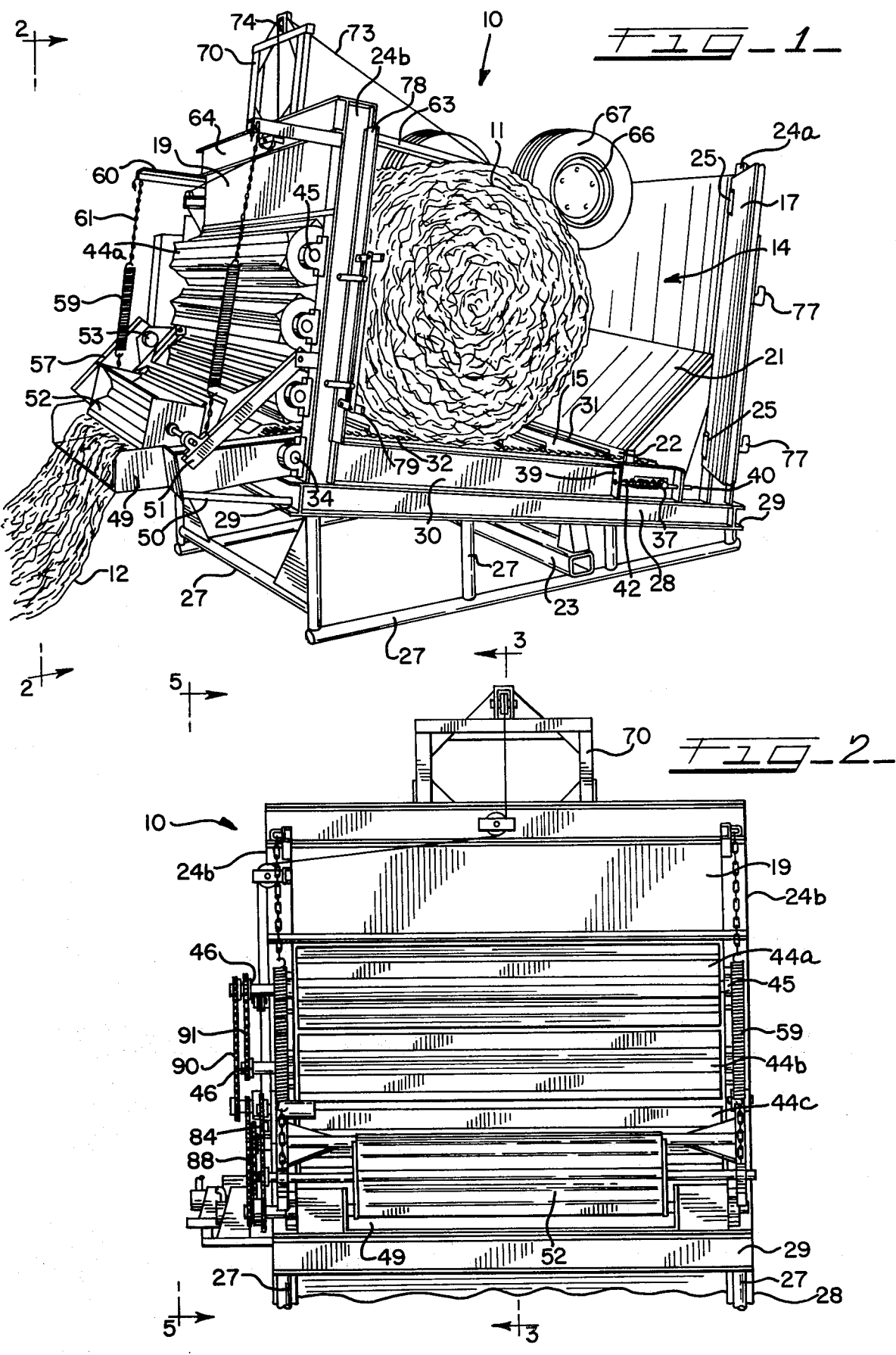

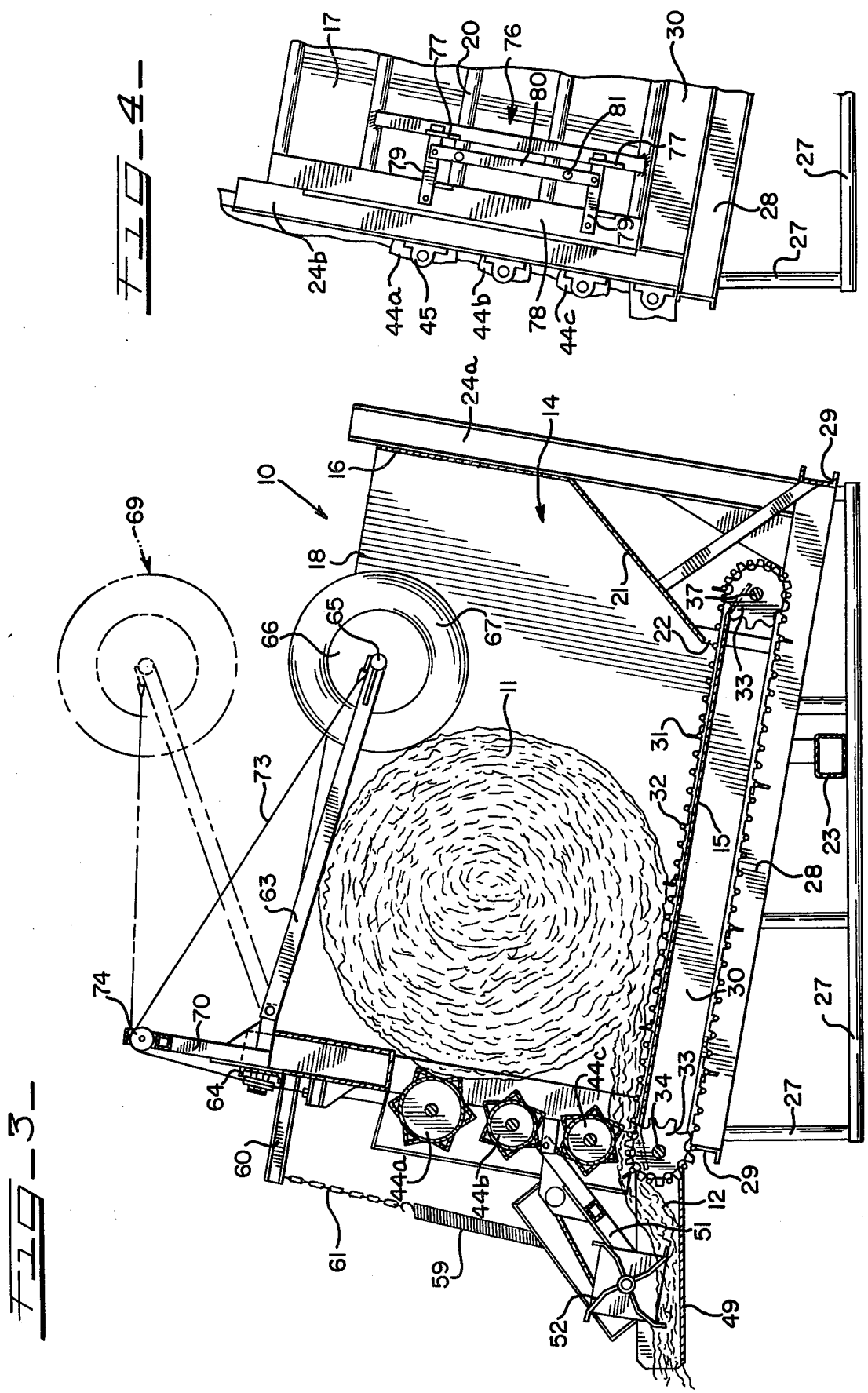

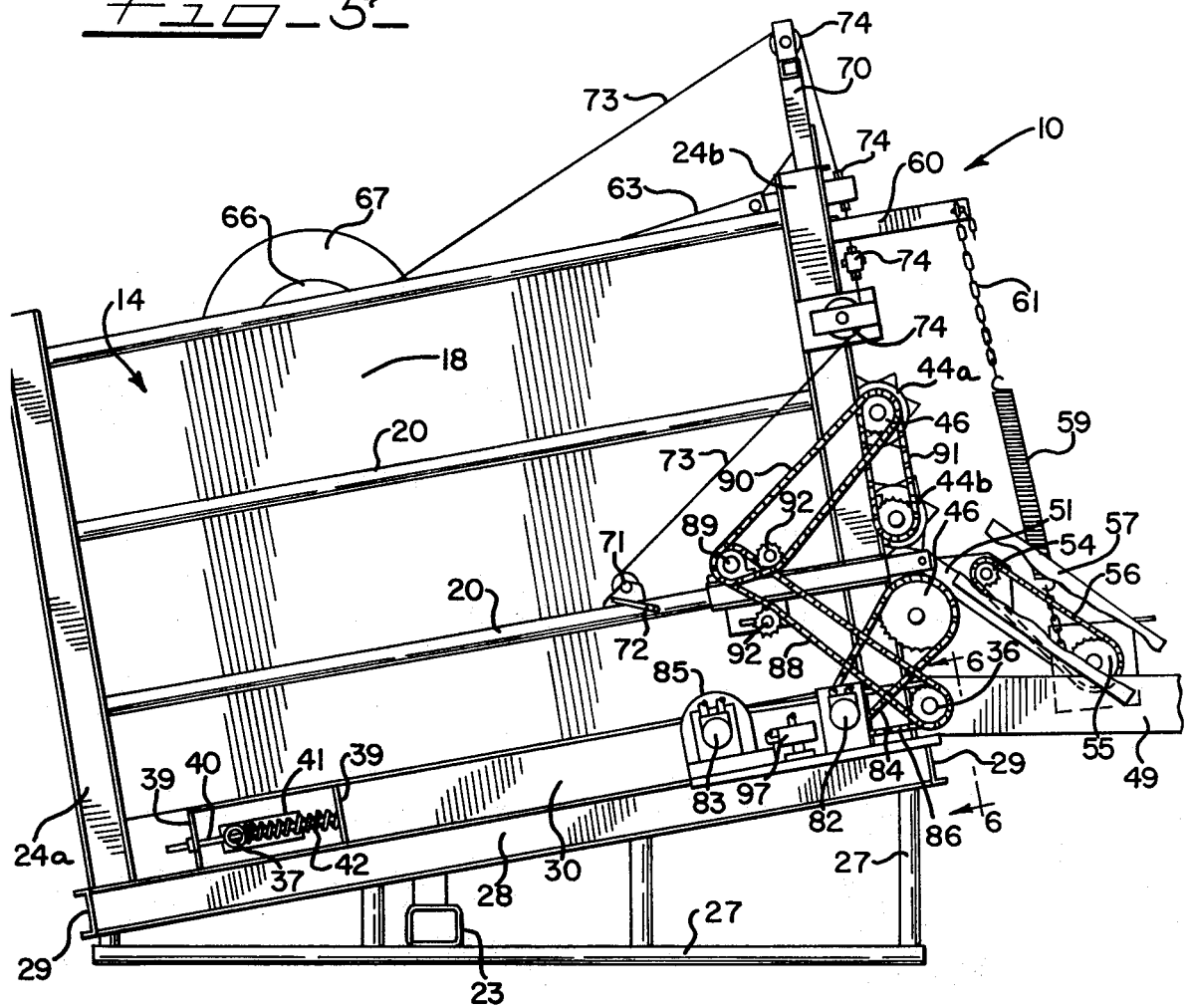
FIG-5-
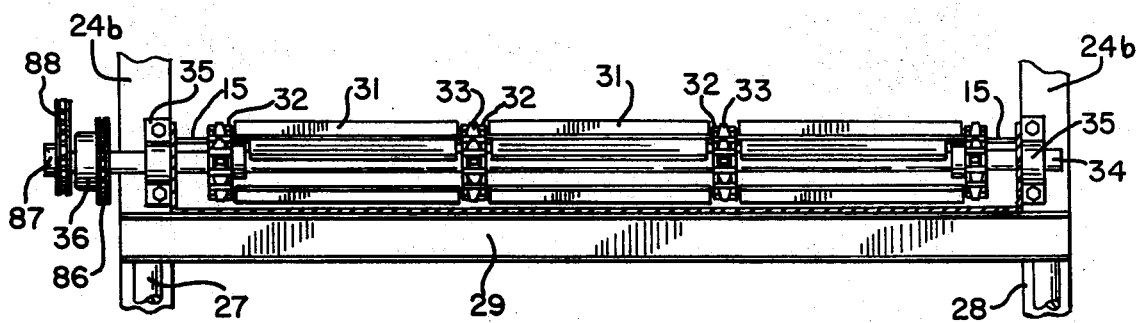
FIG-6-

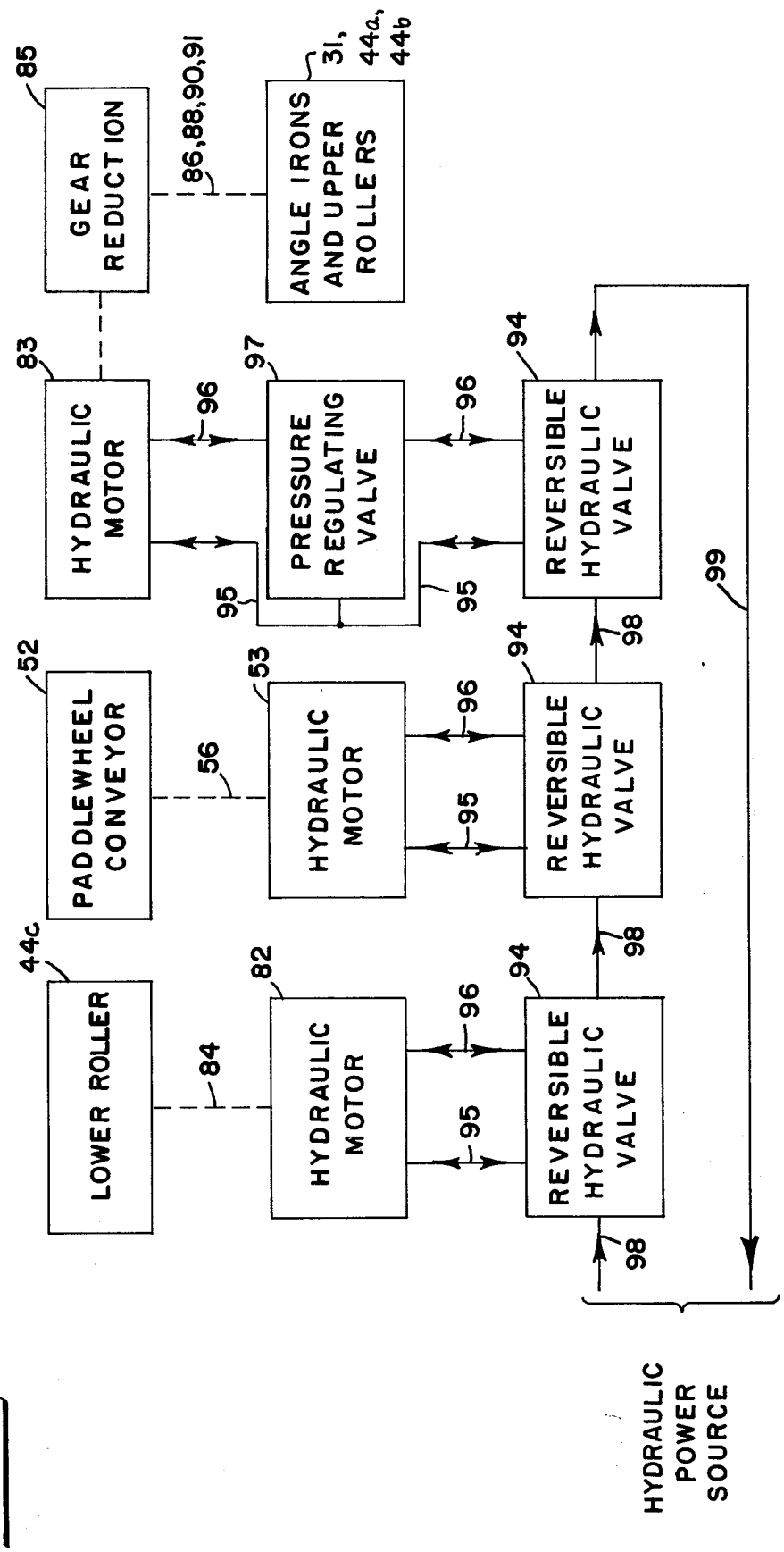

BALE UNROLLER

BACKGROUND OF THE INVENTION

This invention relates in general to apparatus for handling and processing hay, and more particularly to a bale unroller for unrolling a continuous sheet of hay from a large cylindrical bale.

There is currently on the market a variety of agricultural implements for baling hay and related fibrous materials into large cylindrical bales. Such implements pick up hay from a field, and continuously roll the hay into a cylindrical bale until the bale reaches a predetermined size, at which point the bale is ejected from the baler. The large cylindrical bales are typically about six feet in length, five feet in diameter and weigh about 3,000 lbs. The exact dimensions and weight of the bale vary depending upon a number of factors; some of which include the physical characteristics of the baler, the type of hay being baled and the moisture content of the hay material. Because of the size and weight, such large cylindrical bales are not suitable for handling by a single person. Similarly, removal of hay from the bale can be a difficult and burdensome task not only because of the size and weight of the bale, but also because the winding of the hay during the baling process causes the hay fibers to become matted together. Thus, removal of portions, rather than sheets, of the hay from the bale are considerably more difficult than in other types of bales, such as those which are compressed to form a smaller rectangular bale.

A principal object of the present invention is therefore to provide a new and improved bale unroller for unrolling a large cylindrical bale of hay for removal of a continuous sheet of hay therefrom, in a manner reverse to that in which the bale was rolled by a baler.

A related object is to provide a rectangular boxlike container for supporting and containing the bale in the bale unroller, and means for imparting rotative movement to the bale such that a continuous sheet of hay may be removed from the bale.

Another object of the present invention is to provide more controlled unrolling action by providing a plurality of rollers for containing and driving the bale during rotative movement thereof and further providing means for urging the bale toward and into contact with the rollers.

Yet another object is to provide conveying means for discharging the sheet of hay from the bale unroller.

Another object of the present invention is to provide a bale unroller in which the floor or bed of the unroller is inclined downwardly from the front or discharge end to the rear of the bale unroller such that forward and unrolling movement of the bale does not tend to cause the bale to become jammed or lodged between the floor and the plurality of rollers.

A further object of the present invention is to provide methods for unrolling a large cylindrical bale by removing a continuous sheet of fibrous material therefrom.

It is further intended to provide a bale unroller incorporating the above objects and advantages and further having drive means which is operable in either rolling or unrolling directions relative to the bale for additional control over the operation of the bale unroller, such as for removal of anything which tends to obstruct the unrolling of the bale, removal of any jamming condition of the bale, maintenance or the like.

SUMMARY OF THE INVENTION

A boxlike container is of sufficient size for receiving a bale of hay and has a door on one side thereof to facilitate placement of the bale in the container. A plurality of transversely extending angle irons at spaced intervals are slidably driven across the floor of the container by continuous chains attached to ends of the angle irons. The sliding angle irons engage the bottom surface of the bale and impart rotative movement thereto. A plurality of horizontally extending rollers at spaced vertical intervals at the front of the bale unroller are rotatably driven to further impart rotative movement to the bale.

Means are disposed above and rearwardly of the bale to urge the bale forwardly for contact with the plurality of rollers. Such means may include a plurality of wheels pivotally attached by a framework to a point near the front of the bale unroller such that the plurality of wheels defines an arc about the pivot point in a pendulumlike manner. Another framework extending above the container of the bale unroller in combination with a wire and a winch provides means for lifting the plurality of wheels above the container such that the wheels do not interfere with or block placement of the bale in the container.

The conveying means for conveying the sheet of hay from the bale unroller includes a sheet conveying chute with a paddle wheel pivotally and resiliently suspended thereabove. The paddle wheel is separately driven. The pivotal and resilient suspension of the paddle wheel over the chute accommodates varying thicknesses in the sheet of hay. Variations may occur due to nonuniform grain or grass density in the field, cutting or windrowing of same, the baling process, or the unrolling process. To obtain better control over the unrolling action of the rotating bale, the floor of the bale unroller is preferably inclined upwardly from the rear of the bale unroller toward the front or discharge end. The inclination of the floor provides improved unrolling of the bale and helps avoid jamming of the bale between the floor and the plurality of rollers at the front of the bale unroller by offsetting the effects of the sliding angle irons which tend to move the bale forwardly during rotation thereof and also the effects of the wheels is urging the bale toward the rollers.

The drive system for the angle irons, rollers and conveyor paddle wheel are operable in either forward or reverse directions such that operation of the bale unroller may be reversed to aid in curing any abnormal rotation of the bale in the bale unroller, for removal of any obstructions, or for maintenance purposes.

Methods of unrolling a cylindrical bale of fibrous shay by removing a continuous sheet of fibrous material therefrom include providing a bale unroller of the above characteristics, lifting the rotative means for urging the bale into contact with the rollers to an elevated position, inserting the bale into the unroller, lowering the rotative means into contact with the bale, starting the movable means to impart rotative movement to the bale, and conveying the sheet of hay from the bale unroller by driving a paddle wheel conveyor which is pivotally and resiliently suspended above a tray and the sheet of hay.

Various other objects, features and advantages of the invention will become apparent from the following detailed disclosure taken in conjunction with the drawings.

BRIEF DESCRIPTION OF THE DRAWINGS

In the drawings:

FIG. 1 is a perspective view from the front and one side of a bale unroller in accordance with the present invention with a side door of the bale unroller opened for better illustrating of the interior of the bale unroller and for further illustrating the typical position of a large cylindrical bale therein during removal of a sheet of material from the bale;

FIG. 2 is a partial front elevational view of the bale unroller of FIG. 1;

FIG. 3 is a view taken on line 3—3 of FIG. 2 with certain parts being shown in section and others in elevation;

FIG. 4 is a fragmentary side elevation of the bale unroller with the side door closed and latched to illustrate the latching arrangements;

FIG. 5 is a side elevational view taken at line 5—5 of FIG. 2.

FIG. 6 is a fragmentary elevational view of the bale unroller taken along line 6—6 in FIG. 5 for illustrating a plurality of angle irons extending transversely across a floor of the bale unroller for imparting rotative movement to the bale for unrolling of same; and FIG. 7 is a block and schematic flow diagram of a drive system for the bale unroller illustrating the hydraulic and mechanical relationships between the components of the drive system and other portions of the bale unroller.

DESCRIPTION OF THE PREFERRED EMBODIMENT

Turning now to the drawings, there is shown in FIGS. 1 through 6 an exemplary bale unroller, generally designated 10, for unrolling a generally cylindrical bale 11 of hay. The bale unroller 10 removes a continuous ribbon or sheet 12 of hay from the bale 11 by unrolling same.

A boxlike container 14 (FIGS. 1 and 3) for receiving and containing the bale 11 has a floor 15 for supporting the bale 11, a back 16, a side door 17, an opposite side 18 and a front top panel 19. Since the door 17, the side 18 and the back 16 are typically fabricated from metal sheet stock, the door 17, the side 18 and the back 16 may be reinforced against forces or loads normal to the surfaces thereof by longitudinally extending pipes 20 (FIGS. 4 and 5). Other types of reinforcing may also be employed, such as angle irons and corrogations or ribs formed into the metal sheet stock by metal forming processes. The back 16 preferably has a lower inwardly extending portion 21 (FIGS. 1 and 3) which terminates short of the floor 15 leaving an elongated horizontal slot 22 therebetween. The inwardly extending back portion 21 aids in preventing the bale 11 from being placed too far back in the container 14, especially if the bale 11 is of smaller than usual diameter. A plurality of upwardly extending I-beams 24 are disposed at corners of the container 14 for connection and support of the back 16, the side 18 and the top panel 19. One of the I-beams 24a pivotally supports the door 17 along one vertical edge thereof by a pair of hinges 25 such that the door 17 may be opened to gain access to the interior of the bale unroller 10 and for placing a bale 11 therein.

According to one aspect of the invention, to obtain improved unrolling or rotating movement of the bale 11, which will be more fully considered hereinafter, the floor 15 of the bale unroller 10 is upwardly inclined from the rear of the bale unroller 10 toward the front thereof. A plurality of base support members 27 extend laterally, longitudinally and upwardly to support a pair of parallel and spaced apart beams 28 at the desired angle of inclination. An additional transverse beam 23 provides further support and bracing for the beams 28 and some of the members 27. Ends of the inclined beams 28 are connected by horizontally and transversely extending beams 29. Ends of the inclined beams 28 also support the upwardly extending beams 24a and 24b. An additional inclined beam 30 overlies and rests upon the beam 28 for supporting the floor 15 at an inclined and elevated position relative to the ground.

According to another aspect of the invention, there is provided means for imparting rotative movement to the bale 11 such that the continuous sheet 12 of fibrous material may be unwound therefrom. To this end, a plurality of angle irons 31 are disposed transversely across the floor 15 of the bale unroller 10 at spaced intervals and in generally parallel relationship with ends of the angle irons 31 connected to continous chains 32. After advancing to the front or discharge end of the unroller 10, each angle iron 31 passes downwardly and under the floor 15 to again return along the floor 15 through the slot 22 (FIG. 3). As can be better seen in FIG. 6, continuous chains may also be provided at positions intermediate the edges of the floor 15 such that a plurality of approximately equal length angle iron segments are placed end to end between the chains 32 to span the width of the floor 15. Each segment of angle iron 31 thereby operates at reduced levels of stress compared to a single angle iron 31 extended transversely across the width of the floor 15. A plurality of sprockets 33 are fixedly attached to a shaft 34 at spaced locations therealong which coincide with the chains 32 such that rotation of the shaft 34 causes rotation of the sprockets 33, movement of the chains 32, and sliding movement of the angle irons 31 across the floor 15 of the bale unroller 10. The shaft 34 is rotatably supported by a pair of bearings 35 which are mounted to the front upright members 24b. One end of the shaft 34 is provided with a drive sprocket 36 which is chain driven from a source of drive, which will be more fully presented hereinafter.

Turning now to FIG. 3, it will be seen that, as the angle irons 31 are slidably moved from the rear to the front of the bale unroller 10 along the floor 15, upright portions of the angle irons 31 will frictionally engage the lower surfaces of the bale 11. Thus, even though the bale 11 may rest upon and be primarily supported by the floor 15, the angle irons 31 tend to cause the lower surface of the bale 11 to slide forwardly along the floor 15 and thereby tend to cause the bale 11 to rotate clockwise as viewed in FIG. 3. Although it is preferable to place the bale 11 to be unwound in the bale unroller 10 such that the sheet 12 of hay is spirally wound in a clockwise direction, as viewed in FIG. 3 from the interior of the bale 11 to the exterior, it has been found that hay will become unwound by rotative movement of the bale 11 even if the bale 11 is inserted into the unroller 10 with a counterclockwise winding as viewed in FIG. 3. After separating from the bale 11, the sheet 12 of hay is forwardly advanced along the floor 15 by the angle irons 31.

Any slack in the continuous chains 32 is removed at a rear shaft 37 (FIGS. 1 and 5) on which chain sprockets 33 are mounted. A pair of tabs 39 are transversely disposed along the inclined beam 30, with one of the tabs 39 on either side of the rear shaft 37. The rear shaft 37 extends through a slot 41 provided in the beam 30 between the tabs 39. A bolt 40 extends between the tabs 39 and through an apertured end of the shaft 37. The bolt 40 may be threaded for fixed, threaded adjustment of tension in the chains 32 or resilient means, such as a spring 42, may resiliently remove any slack from chains 32. Since the rear shaft 37 will be unable to rotate due to the arrangement of the bolt 40 extending through an end of the shaft 37, the sprockets 33 on the rear shaft 37 are free to rotate thereabout and may be provided with bearings therebetween if desired.

To further facilitate rotation of the bale 11 in the unroller 10, a plurality of horizontally disposed rollers 44a, 44b, 44c (collectively referred to as 44) are provided at the front of the unroller 10. Ends of the rollers 44 are secured at spaced vertical locations along the upwardly extending I-beams 24b by bearings 45. Initially, a large cylindrical bale 11 may only come into contact or tangential engagement with the uppermost roller 44a. As the bale 11 is unwound and becomes of increasingly smaller diameter, the bale 11 will begin to contact other rollers 44b, 44c disposed below the uppermost roller 44a. For most advantageous utilization of the invention, the set of rollers 44 are also driven to aid in rotating the bale 11 in the unroller 10. To this end, each of the rollers 44 has a sprocket 46 (FIGS. 2 and 5) at one end of the rollers 44 for chain drive from a drive source. The rollers 44 preferably have irregular surfaces for better frictional contact with the bale 11. These irregular surfaces can be formed in a variety of ways, such as by welding angle irons longitudinally along the surfaces of the rollers 44 to form "V" shaped projections therealong. Other types of grooves or surface irregularities could also be employed along the surfaces of the rollers 44.

According to another aspect of the invention, there is provided means for positively discharging or conveying the sheet 12 of hay from the bale unroller 10. A discharge chute 49 (FIG. 1) projects forwardly and downwardly from the front of the bale unroller 10. The chute 49 may be secured to adjacent beams 24b, 29. The chute 49 is also provided with appropriate apertures through which the shaft 34 extends. Additional braces 50 between the beam 29 and the chute 49 may also be utilized for support thereof. A pair of arms 51 pivotally depend from upright beams 24b for rotatably supporting a paddle wheel 52 beteen the arms 51. The paddle wheel 52 extends transversely across most of the width of the chute 49. Also mounted on one of the arms 51 is a hydraulic motor 53 (FIG. 1) which drives the paddle wheel 52 by means of sprockets 54,55 (FIG. 5) and chain 56. A guard 57 covers the chain 56 and sprockets 54,55 to protect against personal injury. Each of the arms 51 is also resiliently supported by a spring 59 from another pair of arms 60 which extend normally and forwardly from the upright beams 24b near the tops thereof. Forward ends of the arms 60 are slotted or otherwise provided with means for adjusting tension in the springs 59 by changing the linkage position of chains 61 which extend between the springs 59 and the arms 60. Adjustment of tension in the springs 59 gives the paddle wheel 52 a floating action over the sheet 12 of hay to accommodate variations in the thickness of the sheet 12. The sheet 12 of hay leaves the angle irons 31 and the floor 15 and is fed onto the chute 49 as the angle irons 31 reach their forwardmost positions and begin to turn downwardly and rearwardly over the front sprockets 33 to return toward the back of the unloader 10 beneath the floor 15. As sheet 12 is deposited onto the discharge chute 49, the paddle wheel 52 continues to drive the sheet 12 forwardly and off of the chute 49. The chute 49 may discharge the sheet 12 to other machinery, such as other baling or chopping equipment, for further processing of the hay or for a variety of purposes. The sheet 12 could, of course, also be discharged onto the ground for feeding livestock at the unroller 10.

According to another aspect of the invention, means are provided to urge the bale 11 toward the rollers 44 and to maintain contact therewith. With reference to FIGS. 1 and 3, a pair of arms 63 pivotally depend from a horizontally disposed I-beam 64 which extends between top ends of the front upright beams 24b. Opposite ends of the arms 63 are connected to an axle 65 which has a pair of wheels 66 secured to ends thereof. A tire 67 may be mounted on each of the wheels 66. In normal operation of the unroller 10, the tires 67 rotatably engage the bale 11 to urge the bale 11 forwardly against the rollers 44 and to prevent the bale 11 from rolling backwards down the inclined floor 15 during movement of the angle irons 31 thereacross. The tires 67 swing downwardly and forwardly in a pendulum like manner and depend upon gravitational forces to engage the bale 11. As the bale 11 becomes of increasingly small diameter due to the unrolling, the tires 67 swing downwardly and forwardly to remain in contact with the bale 11 until the bale 11 is of such small diameter that the wheels 67 come into contact with the floor 15. It will be readily recognized by those skilled in the art that other rotatable means may be substituted for the wheels 66 and tires 67, for example a drum or cylinder.

The wheels 66, tires 67, axle 65 and arms 63 must be raised to an elevated position, such as that indicated generally as 69 in FIG. 3, to permit a new bale 11 to be inserted into the unroller 10. Toward this end there is provided an upstanding framework 70 on top of the horizontal beam 64, a winch 71 (FIG. 5) with a crank 72, said winch 71 mounted on the side 18 of the unroller 10, a wire 73 extending from the winch 71 to the axle 65 and a plurality of pulleys 74 mounted at various points along the bale unroller 10 for guiding the wire 73 between the winch 71 and the axle 65. By rotating the crank 72 of the winch 71, tension is placed in the wire 73 and the wheels 67 may be raised to the elevated position 69. After a bale 11 has been placed in the unroller 10 the tires 67 may be lowered against the bale 11 and the wire 73 is thereafter left slack so that the wheel 67 may contact against the bale 11 by gravitational forces. The framework 70 is centrally located along the beam 64 and the wire 73 is connected near a midpoint of the axle 65 such that the arms 63, the axle 65, the wheels 66, and the tires 67 may be raised or lowered by the wire 73 in a balanced manner.

As previously noted, access to the interior of the bale unroller 10 is gained by the hinged door 17. With reference to FIGS. 1 and 4, there is provided a latching mechanism, generally designated 76, to lock the door 17 in the closed position, or to open same. A pair of tabs 77 each define an upwardly opening slot between the tabs 77 and the doors 17. The latching mechanism 76 further includes a latching plate 78 (FIG. 4) hingedly connected along the upright beam 24b, a pair of latching bars 79 pivotally connected to said plate 78 at spaced points therealong, an operating member 80 pivotally connected between said latching bars 79 and a pair of operating handles 81 on the member 80. An upward lifting movement on the handles 81 causes the latching bars 79 to pivot upward and be removed from the tabs 77 to unlatch the door. However, the door 17 cannot be swung open until the plate 78 and the latch bars 79 are first pivotally moved away from the door 17, as better seen in FIG. 1, to thereby permit the front edge of the door 17 to pass by the plate 78 and the latching bars 79. It will therefore be appreciated that while only two latching bars 79 make latching engagement with the tabs 77 on the door 17, the plate 78 closingly engages the entire front vertical edge of the door 17 when the latching mechanism 76 is closed.

Reference has previously been made to a drive source for the angle irons 31 and the rollers 44. The entire drive system for the bale unroller 10 will now be considered, especially with reference to FIGS. 5 and 7. The unroller 10 utilizes a plurality of hydraulic motors 53, 82, 83. The hydraulic motor 82 directly drives the lower roller 44c of the set of rollers 44 by a chain 84 and associated sprocket 46. Another hydraulic motor 83 is mechanically connected to a gear reduction unit 85 which in turn is mechanically connected by a chain 86 to the sprocket 36 (FIG. 6) for rotating the shaft 34 and the sprockets 33 to move the angle irons 31. Also affixed to the shaft 34 adjacent the sprocket 36 is another sprocket 87 which is connected via a chain 88 to one of a pair of sprockets 89 mounted along the reinforcing pipe 20 on the side 18 of the bale unroller 10. The pair of sprockets 89 are mechanically interconnected for driving another chain 90 which in turn drives the sprocket 46 associated with the top roller 44a. The intermediate roller 44b is slavingly driven by yet another chain 91 between the sprockets 46 associated with the rollers 44a, 44b. Chain tighteners 92 may be employed to remove any slack from the chains 88, 90.

The lower roller 44c is independently driven by hydraulic motor 82 such that the lower roller 44c may rotate clockwise as viewed in FIG. 3 to aid in conveying the sheet of fibrous material 12 out of the bale unroller 10 at the same time that the upper rollers 44a, 44b are rotating counterclockwise to aid in rotating the bale 11. However, the lower roller 44c may also be driven counterclockwise, if desired, when the bale 11 becomes of sufficiently reduced diameter to begin contacting the roller 44c.

The motors 53, 82 are connected to a reversible hydraulic valve 94 (FIG. 7) by a pair of hydraulic hoses 95, 96. A pressure regulating valve 97 is interposed in the hoses 95, 96 between the hydraulic motor 83 and the associated reversible hydraulic valve 94. The pressure regulating valve 97 permits regulation of the speed of the angle irons 31 across the floor 15 and the rotation of the upper rollers 44a, 44b, for controlling the speed of rotation, and hence unrolling, of the bale 11 and to further coordinate unrolling of the bale 11 with the operating speed of the lower roller 44c and the paddle wheel conveyor 52. The hydraulic valves 94 are all reversible since it may be desirable to reverse any of the moving elements of the bale unroller 10 for various purposes, including removal of any obstructions, correction of any jamming of the bale 11 or portions thereof in the bale unroller, and maintenance. The hydraulic valves 94 are series connected by hydraulic lines 98, 99 to a hydraulic power source, such as a hydraulic pump (not shown), which provides adequate hydraulic pressure for driving the motors 53, 82, 83.

Implicit in the above description of the bale unroller 10 are methods of unrolling a cylindrical bale 11 to remove a continuous sheet of hay therefrom. The basic method includes providing a bale unroller 10 of the above-described type, lifting the tires 67 to the elevated position 69, inserting the bale 11 into the unroller 10, lowering the tires 67 to contact the bale 11 and to urge the bale 11 toward the rollers 44, and driving the angle irons 31 to impart rotative movement to the bale 11 to unwind and remove a continuous sheet 12 of hay therefrom. Related and additional method steps include opening of the door 17 prior to inserting the bale 11 and closing and latching the door 17 thereafter, and conveying the sheet 12 of hay from the unroller 10 by means of a paddle wheel conveyor 52.

It will be understood that various changes and modifications may be made without departing from the spirit of the invention as defined in the following claims, and equivalents thereof.

We claim:

1. A bale unroller for unrolling a generally cylindrical bale of hay for removal of a continuous sheet of hay therefrom, said bale unroller comprising:

supporting means for supporting said bale in said bale unroller;

movable means disposed along said supporting means for engaging said bale to impart rotative movement to said bale for unrolling a sheet of hay therefrom;

roller means disposed above said supporting means for engaging against said bale and for containing said bale in said bale unroller during rotative movement of the bale; and gravity and rotative means for urging said bale toward said roller means.

2. The bale unroller as defined in claim 1 further comprising discharge means for discharging said sheet of hay from said bale unroller.

3. The bale unroller as defined in claim 2 wherein said discharge means comprises a chute for receiving the continuous sheet of hay as it emerges from the bale unroller between the movable means disposed along the supporting means and the roller means; a paddle wheel disposed above the chute; and means for driving the paddle wheel to move the sheet of hay along the chute.

4. The bale unroller as defined in claim 3 wherein said paddle wheel is resiliently and pivotally supported above the sheet of hay and the chute to accommodate variations in thickness of the sheet of hay.

5. The bale unroller as defined in claim 1 wherein said supporting means comprises a floor which is elevated above the ground and is further inclined upwardly from a rear of the bale unroller toward a discharge end thereof.

6. The bale unroller as defined in claim 1 wherein said movable means comprises a plurality of parallel and spaced apart angle irons extending transversely across said supporting means; a plurality of chains interconnecting said ends of angle irons, and means for driving said plurality of chains to move said angle irons to thereby impart rotative movement to said bale.

7. The bale unroller defined in claim 6 wherein said chains are continuous and further comprising means for adjusting tension in said chains.

8. The bale unroller defined in claim 1 further comprising a boxlike container to enclose said supporting means and a side door for gaining access into said bale unroller and for placing a bale of hay therein when said door is in an opened position; and latching means for retaining said door when in a closed position.

9. The bale unroller as defined in claim 1 wherein said roller means comprises a plurality of horizontally disposed rollers at spaced vertical positions along a discharge end of said bale unroller.

10. The bale unroller defined in claim 9 wherein said plurality of rollers are each provided with longitudinal irregularities along the surfaces of the rollers; and drive means is provided for each of said rollers for aiding said movable means in imparting rotative movement to said bale.

11. The bale unroller defined in claim 10 wherein a lowermost roller of said plurality of rollers is separately driven such that said lowermost roller may be utilized for conveying the sheet of hay when said bale is of substantial diameter.

12. The bale unroller defined in claim 1 wherein said gravitational and rotative means for urging the bale toward said roller means comprises rotatable means disposed above and rearwardly of the bale for rotatably engaging against said bale; and means for pivotally connecting said rotatable means to a frame member of said bale unroller such that the rotatable means is pivotable in a pendulumlike manner relative to said frame member.

13. The bale unroller defined in claim 12 further comprising means for lifting said rotatable means to an elevated position to facilitate insertion of a bale into said bale unroller, said lifting means thereafter being operable to permit said rotatable means to engage said bale by gravitational forces.

14. The bale unroller defined in claim 1 further comprising hydraulic drive means operatively connected to said movable means to provide movement of said movable means along said support means.

15. The bale unroller as defined in claim 14 wherein said hydraulic drive means is further operatively connected to said roller means such that rotative movement of said roller means is related to the movement of said movable means.

16. The bale unroller as defined in claim 15 wherein said hydraulic drive means is of a reversible type.

17. The bale unroller as defined in claim 15 further comprising separate hydraulic drive means operatively connected to a lowermost roller of said roller means for driving said lowermost roller independently of said movable means.

18. A bale unroller for unrolling a generally cylindrical bale of hay for removal of a continuous sheet of hay therefrom, said bale unroller comprising:
  supporting means for supporting said bale in said bale unroller; said supporting means comprising a floor which is elevated above the ground and is further inclined upwardly from a rear of the bale unroller toward a discharge end thereof;
  a boxlike container to enclose the supporting means;
  a side door for gaining access into said bale unroller and for placing a bale of hay therein when said door is in an opened position;
  latching means for retaining the door when said door is in a closed position;
  movable means disposed along said supporting means for engaging said bale to impart rotative movement to said bale for unrolling a sheet of hay therefrom, said movable means comprising a plurality of parallel and spaced apart angle irons extending transversely across said supporting means and a plurality of continuous chains interconnecting ends of said angle irons;
  means for adjusting tension in said chains;
  roller means disposed above said supporting means for engaging against said bale and for containing said bale in said bale unroller during rotative movement of the bale, said roller means comprising a plurality of horizontally disposed rollers at spaced vertical positions along a discharge end of said unroller, each of said rollers provided with longitudinal irregularities along the surfaces of said rollers;
  gravity and rotative means for urging said bale toward said roller means, said gravity and rotative means comprising rotatable means disposed above and rearwardly of the bale for rotatably engaging against the bale, means for pivotally connecting said rotatable means to a frame member of said bale unroller such that the rotatable means is pivotable in a pendulumlike manner relative to said frame member;
  means for lifting said rotatable means to an elevated position to facilitate insertion of a bale into said bale unroller, said lifting means thereafter being operable to permit said rotatable means to engage said bale by gravitational forces;
  discharge means for discharging said sheet of hay from said bale unroller, said discharge means comprising a chute for receiving the continuous sheet of hay as it emerges from the bale unroller between the movable means and the roller means, a paddle wheel disposed above said chute, said paddle wheel resiliently and pivotally supported above the sheet of hay and the chute to accommodate variations in thickness of the sheet of hay;
  hydraulic drive means operatively connected to said movable means and said roller means to provide movement therefor; and
  additional hydraulic drive means operatively connected to said paddle wheel to provide drive therefor.

19. A method of unrolling a generally cylindrical bale of hay for removal of a continuous sheet of hay therefrom, said method comprising:
  providing a bale unroller having an elevated floor relative to the ground, means movable along said floor for imparting rotative movement to said bale, roller means disposed above said floor for engaging against and retaining said bale in said bale unroller during rotative movement of said bale and rotative means for urging said bale toward said roller means including means for lifting said rotative means, and drive means for said movable means;
  lifting said rotative means to an elevated position;
  inserting said cylindrical bale into said bale unroller;
  lowering said rotative means against said cylindrical bale to urge said bale into engagement with said roller means; and
  driving said movable means to impart rotative movement to said bale to unwind and remove a continuous sheet of hay therefrom.

20. The method as defined in claim 19 further comprising the additional step of discharging said sheet of hay from said bale unroller by means of a paddle wheel resiliently and pivotally suspended above a discharge chute.

* * * * *